(12) United States Patent
Nishida et al.

(10) Patent No.: US 7,700,243 B2
(45) Date of Patent: Apr. 20, 2010

(54) ELECTROLYTE SOLUTION AND NONAQUEOUS ELECTROLYTE LITHIUM SECONDARY BATTERY

(75) Inventors: Tetsuo Nishida, Izumiotsu (JP);
Megumi Tomisaki, Izumiotsu (JP);
Kazutaka Hirano, Izumiotsu (JP);
Akihiro Nabeshima, Tokushima (JP);
Hiroaki Tokuda, Tokushima (JP)

(73) Assignees: Otsuka Chemical Co., Ltd., Osaka (JP);
Stella Chemifa Corporation, Osaka (JP)

( * ) Notice: Subject to any disclaimer, the term of this patent is extended or adjusted under 35 U.S.C. 154(b) by 678 days.

(21) Appl. No.: 10/578,092

(22) PCT Filed: Nov. 2, 2004

(86) PCT No.: PCT/JP2004/016613

§ 371 (c)(1),
(2), (4) Date: May 3, 2006

(87) PCT Pub. No.: WO2005/043668

PCT Pub. Date: May 12, 2005

(65) Prior Publication Data

US 2007/0037064 A1 Feb. 15, 2007

(30) Foreign Application Priority Data

Nov. 4, 2003 (JP) .............................. 2003-374785

(51) Int. Cl.
*H01M 1/40* (2006.01)
(52) U.S. Cl. ...................................... 429/347; 429/338
(58) Field of Classification Search ............ 429/231.95, 429/338, 347, 200, 231.4, 188, 303, 324, 429/325; 361/502, 504
See application file for complete search history.

(56) References Cited

U.S. PATENT DOCUMENTS

| 7,097,944 B2 * | 8/2006 | Murai et al. ................. 429/330 |
| 2006/0068296 A1 * | 3/2006 | Nakagawa et al. ........... 429/324 |
| 2007/0031729 A1 * | 2/2007 | Sato et al. .................... 429/188 |

FOREIGN PATENT DOCUMENTS

| JP | 4-349365 A | 12/1992 |
| JP | 2002-373704 A | 12/2002 |
| JP | 2003-229021 A | 8/2003 |
| JP | 2003-288939 A | 10/2003 |
| JP | 2004-247176 A | 9/2004 |
| JP | 2004247176 | * 9/2008 |

* cited by examiner

*Primary Examiner*—Patrick Ryan
*Assistant Examiner*—Monique Wills
(74) *Attorney, Agent, or Firm*—Kubovcik & Kubovcik

(57) ABSTRACT

An electrolytic solution for use in nonaqueous electrolytic lithium secondary cells which contains a room temperature molten salt, i.e., an aliphatic quaternary ammonium salt of the formula (1), an organic solvent and a lithium salt of the formula (2), the electrolytic solution being characterized in that the organic solvent contains vinylene carbonate in an amount of 1 to 5 wt. % based on the electrolytic solution, and a lithium secondary cell using the electrolytic solution $$R^2-\underset{\underset{R^3}{|}}{\overset{\overset{R^1}{|}}{N}}-R^4 \quad X^1 \tag{1}$$

$$LiX^2 \tag{2}$$

wherein $R^1$ to $R^3$ are each a chain hydrocarbon having 1 to 4 carbon atoms, $R^4$ is methoxymethyl, ethoxymethyl, propoxymethyl or isopropoxymethyl, and $X^1$ and $X^2$ are each a fluorine-containing anion.

9 Claims, 1 Drawing Sheet

ELECTROLYTE SOLUTION AND NONAQUEOUS ELECTROLYTE LITHIUM SECONDARY BATTERY

This application is a 371 of international application PCT/JP2004/016613, which claims priority based on Japanese patent application No. 2003-374785 filed Nov. 4, 2003, which is incorporated herein by reference.

TECHNICAL FIELD

The present invention relates to electrolytic solutions and nonaqueous electrolytic lithium secondary batteries.

BACKGROUND ART

Lithium ion secondary cells have been improved in performance in recent years for use as power sources for mobile devices. Lithium secondary cells are expected to be useful in the field of peak-shift power sources and motor vehicle assisting power sources from the viewpoint of the energy density of the secondary cell, and it is desired that these cells be further improved in service life and reliability. Lithium secondary cells presently available generally comprise a ceramic oxide serving as a positive electrode active substance for lithium ions to be inserted thereinto and released therefrom, metallic lithium or a lithium alloy, or a carbon material or silicon material for absorbing and desorbing lithium ions for use as a negative electrode, and an electrolytic solution containing a lithium salt as dissolved in an organic solvent.

Electrolytic solutions comprising an organic solvent and heretofore in use are inferior in electric conductivity to aqueous electrolytic solutions for use in lead batteries or the like and still remain to be improved in the internal resistance of cells for uses wherein a high output is required.

Salts melting at room temperature (so-called, room temperature molten salts) are liquids consisting only of ions, have characteristics of being nonvolatile and flame-retardant and have been expected to be applicable to electrolytic solutions for lithium secondary cells.

Typical examples of room temperature molten salts include 1-ethyl-3-methylimidazolium tetrafluoroborate (EMI. $BF_4$). However, the imidazolium salt decomposes at a nobler potential than lithium and is therefore difficult to apply to lithium secondary cells. Studies are under way in recent years on room temperature molten salts and remaining stable over a wider range of potentials.

For example, Nonpatent Literature 1 has revealed that salts comprising bis(trifluoromethanesulfonyl)imide anion and an aliphatic ammonium cation include compounds having a melting point not higher than room temperature and exhibiting improved electrochemical stability.

Patent Literature 1 further shows that aliphatic quaternary ammonium room temperature molten salts are applicable to lithium secondary cells. However, Patent Literature 1 merely discloses that lithium will deposit and dissolve on a nickel substrate in the aliphatic room temperature molten salt, but discloses nothing about any technique for using the salt for lithium secondary cells.

Nonpatent Literature 2 reveals that when graphite which is in wide use as the negative electrode material for lithium secondary cells is used as an electrode in a bath containing ammonium cations, the ammonium cations are decomposed or inserted in between graphite layers. In connection with these problems, Patent Literature 2 discloses a nonaqueous electrolytic secondary cell which is characterized by having a room temperature molten salt and having vinylene carbonate or like cyclic ester, and shows that the presence of the cyclic ester forms on the surface of the negative electrode material a protective film for inhibiting reductive decomposition of cations of the room temperature molten salt, consequently giving stabilized charge-discharge characteristics.

Patent Literature 3 and Patent Literature 4 disclose a nonaqueous electrolytic cell containing an aliphatic room temperature molten salt, and a nonqueous electrolytic lithium secondary cell having high safety and satisfactory charge-discharge characteristics.

Although the foregoing techniques suggest that stabilized charge-discharge behavior of high safety is available, the aliphatic room temperature molten salts and exemplified are all compounds having high viscosity, failing to afford electrolytic solutions which are fully satisfactory in electric conductivity even if the salts are used as admixed with an organic solvent of low viscosity. The use of the salts gives cells increased internal resistance especially over a low temperature range.

[patent literature 1] Japanese patent No. 2981545
[patent literature 2] JP 2003-373704 A
[patent literature 3] JP 2003-203674 A
[patent literature 4] JP 2003-288939 A
[nonpatent literature 1] Ionics,3,356(1997)
[nonpatent literature 2] Electroanalytical Chemistry and Interfacial Electrochem.,53, 329-333(1974)

An object of the present invention is to provide a nonaqueous electrolytic lithium secondary cell wherein an electrolytic solution of high electric conductivity is used and which has reduced internal resistance and stabilized charge-discharge characteristics.

DISCLOSURE OF THE INVENTION

To fulfill the above object, we have conducted intensive research and found that stabilized charge-discharge characteristics can be obtained with reduced internal resistance by using for nonaqueous electrolytic lithium secondary cells an electrolytic solution containing a room temperature molten salt, i.e., an aliphatic quaternary ammonium salt of the formula (1), an organic solvent containing vinylene carbonate in an amount of 1 to 5 wt. % based on the electrolytic solution and a lithium salt of the formula (2). The present invention has been accomplished based on this finding.

The present invention provides an electrolytic solution and a nonaqueous electrolytic lithium secondary cell given below.

1. An electrolytic solution for use in nonaqueous electrolytic lithium secondary cells which contains a room temperature molten salt, i.e., an aliphatic quaternary ammonium salt of the formula (1), an organic solvent and a lithium salt of the formula (2), the electrolytic solution being characterized in that the organic solvent contains vinylene carbonate in an amount of 1 to 5 wt. % based on the electrolytic solution

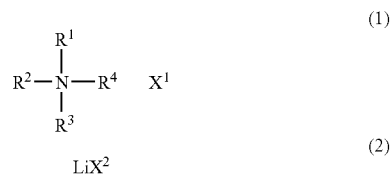

wherein $R^1$ to $R^3$ are each a chain hydrocarbon having 1 to 4 carbon atoms, $R^4$ is methoxymethyl, ethoxymethyl, propoxymethyl or isopropoxymethyl, and $X^1$ and $X^2$ are each a fluorine-containing anion.

2. An electrolytic solution according to claim 1 wherein at least one of the fluorine-containing anions $X^1$ and $X^2$ contains tetrafluoroborate.

3. An electrolytic solution according to any one of claims 1 and 2 wherein the room temperature molten salt is contained in an amount of 1 to 15 wt. % based on the electrolytic solution.

4. An electrolytic solution according to any one of claims 1 and 2 wherein the room temperature molten salt is contained in an amount of 4 to 13 wt. % based on the electrolytic solution.

5. An electrolytic solution according to any one of claims 1 and 2 wherein the room temperature molten salt is contained in an amount of 4 to 9 wt. % based on the electrolytic solution.

6. A nonaqueous electrolytic lithium secondary cell comprising a positive electrode, a negative electrode, a separator and a nonaqueous electrolytic solution, the secondary cell being characterized in that the electrolytic solution according to claim 1 is used as the nonaqueous electrolytic solution.

7. A secondary cell according to claim 6 wherein the electrolytic solution according to claim 2 is used as the electrolytic solution.

8. A secondary cell according to claim 6 wherein the electrolytic solution according to any one of claims 3 to 5 is used as the electrolytic solution.

9. A secondary cell according to any one of claims 6 to 8 which is characterized in that negative electrode is a carbon material which absorbs and desorbs lithium ions.

The present invention will be described below in detail.

The electrolytic solution of the present invention contains a room temperature molten salt, i.e., an aliphatic quaternary ammonium salt of the formula (1), an organic solution containing vinylene carbonate and a lithium salt of the formula (2) as described above.

Examples of aliphatic quaternary ammonium cations for forming the room temperature molten salt and useful for the invention are trimethylmethoxymethylammonium, dimethyl-ethylmethoxymethylammonium, dimethylpropyl-methoxymethyl-ammonium, dimethylbutylmethoxymethyl ammonium, diethylmethylmethoxymethyl ammonium, methylethylpropyl-methoxymethyl ammonium, triethylmethoxymethyl ammonium, diethylplopylmethoxymethyl ammonium, diethylbutylmethoxy-methyl ammonium, dipropylmethylmethoxymethyl ammonium, dipropylethyl-methoxymethyl ammonium, tripropylmethoxymethyl ammonium, tributylmethoxymethyl ammonium, trimethyl-ethoxy-methyl ammonium, dimethylethylethoxymethyl ammonium, dimethylpropylethoxymethyl ammonium, dimethylbutylethoxy-methyl ammonium, diethylmethyl-ethoxymethyl ammonium, triethylethoxymethyl ammonium, diethylpropylethoxymethyl ammonium, diethylbutylethoxymethyl ammonium, dipropylmethyl-ethoxymethyl ammonium, dipropylethylethoxymethyl ammonium, tripropylethoxymethyl ammonium, tributylethoxymethyl ammonium, etc.

Preferable are trimethylmethoxymethyl ammonium, dimethylethylmethoxymethyl ammonium, dimethylpropylmethoxy-methyl ammonium, methylethylpropylmethoxymethyl ammonium, trimethylethoxymethyl ammonium, dimethylethylethoxymethyl ammonium, dimethylpropylethoxymethyl ammonium and methylethylpropyl-ethoxymethyl ammonium.

More preferable are trimethylmethoxymethyl ammonium, dimethylethylmethoxymethyl ammonium, methylethylpropyl-methoxymethyl ammonium, trimethylethoxymethyl ammonium and dimethylethylethoxymethyl ammonium.

Particularly preferable are trimethylmethoxymethyl ammonium and diethylmethylmethoxymethyl ammonium.

Examples of fluorine-containing anions for forming the room temperature molten salt and the lithium salt for use in the present invention are $BF_4^-$, $PF_6^-$, $CF_3SO_3^-$, $N(CF_3SO_2)_2^-$, $N(CF_3SO_2)(CF_3CO)^-$, $N(CF_3SO_2)(C_2F_5SO_2)^-$, etc.

Examples of preferred anions are $BF_4^-$, $PF_6^-$ and $N(CF_3SO_2)_2^-$.

More preferred are $BF_4^-$ and $N(CF_3SO_2)_2^-$.

The room temperature molten salt and useful for the invention is prepared by various processes. Typical of such proceeses is represented by the following formula.

(Process for Preparing the Room Temperature Molten Salt)

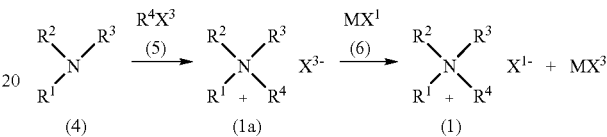

An aliphatic quaternary ammonium salt of the formula (1a) is prepared by reacting an aliphatic tertiary amine of the formula (4) with a compound of the formula (5) wherein $X^3$ is Cl, Br, I or the like.

The aliphatic quaternary ammonium salt of the formula (1a) is then reacted with a compound of the formula (6), whereby the aliphatic quaternary ammonium salt of the formula (1) wherein $X^1$ is other than $X^3$ is prepared.

The atoms represented by M in the formula (6) include H, alkali metal atoms such as Na, K and Li, alkaline earth metal atoms such as Ca, Mg and Ba and metal atoms such as Ag. $X^1$ is, for example, $BF_4$, $PF_6$, $CF_3SO_3$, $N(CF_3SO_2)$, $N(CF_3SO_2)(CF_3CO)$ or $N(CF_3SO_2)(C_2F_5SO_2)$.

The aliphatic tertiary amine of the formula (4) and the compound of the formula (5) are each a known compound.

Examples of aliphatic tertiary amines of the formula (4) are trimethylamine, ethyldimethylamine, dimethylpropylamine, butyldimethylamine, diethylpropylamine, butyldiethylamine, ethylmethylpropylamine, butylethylmethylamine, butylmethylpropylamine, butylethylpropylamine, diethylmethylamine, methyldipropylamine, dibutylmethylamine, triethylamine, ethyldipropylamine, ethyldibutylamine, tripropylamine, etc. Useful amines are no limited to these amines.

Examples of the compounds of the formula (5) are chloromethyl methyl ether, bromomethyl methyl ether, iodomethyl methyl ether, chloromethyl ethyl ether, bromomethyl ethyl ether, iodomethyl ethyl ether, chloromethyl propyl ether, bromomethyl propyl ether, iodomethyl propyl ether, chloromethyl isopropyl ether, bromomethyl isopropyl ether, iodomethyl isopropyl ether, etc.

The two compounds are reacted in a suitable solvent.

The solvent to be used can be a wide variety of known solvents insofar as they are capable of solving the aliphatic tertiary amine of the formula (4) and the compound of the formula (5) and will not adversely affect the reaction. Examples of such solvents are benzene, toluene, xylene and like aromatic hydrocarbons, dichloromethane, chloroform, carbon tetrachloride and like hydrocarbon halides, methanol, ethanol, isopropanol, n-butanol, tert-butanol and like lower alcohols, acetone, methyl ethyl ketone and like ketones, diethyl ether, diisopropyl ether and like ethers, n-hexane, n-heptane and like aliphatic hydrocarbons, cyclohexane and like aliphatic hydrocarbons, etc.

Preferable among these solvents are toluene and like aromatic hydrocarbons, chloroform and like hydrocarbon halides and acetone and like ketones. These solvents can be used singly, or at least two of them are usable in admixture. Especially preferable to use are solvents which are free from water.

The aliphatic tertiary amine of the formula (4) and the compound of the formula (5) are used in the ratio usually of 0.5 to 5 moles, preferably 0.9 to 1.2 moles, of the latter per mole of the former.

The reaction of the aliphatic tertiary amine of the formula (4) with the compound of the formula (5) is conducted usually at −10 to 25° C. The reaction is completed generally in several hours to about 72 hours.

The reaction of the quaternary ammonium salt of the formula (1a) obtained above with the compound of the formula (6) is conducted usually by a salt exchange reaction.

The compound of the formula (6) used as a starting material is a known compound. Examples of these are $HBF_4$, $LiBF_4$, $NaBF_4$, $KBF_4$, $AgBF_4$, $HPF_6$, $LiPF_6$, $NaPF_6$, $KPF_6$, $CF_3SO_3H$, $CF_3SO_3Li$, $CF_3SO_3Na$, $CF_3SO_3K$, $HN(CF_3SO_2)_2$, $LiN(CF_3SO_2)_2$, $NaN(CF_3SO_2)_2$, $KN(CF_3SO_2)_2$, $HN(CF_3SO_2)(CF_3CO)$, $LiN(CF_3SO_2)(CF_3CO)$, $NaN(CF_3SO_2)(CF_3CO)$, $KN(CF_3SO_2)(CF_3CO)$, $HN(CF_3SO_2)(C_2F_5SO_2)$, $LiN(CF_3SO_2)(C_2F_5SO_2)$, $NaN(CF_3SO_2)(C_2F_5SO_2)$, $KN(CF_3SO_2)(C_2F_5SO_2)$, etc.

This reaction is conducted in a suitable solvent.

The solvent to be used can be a wide variety of known solvents insofar as they are capable of dissolving the quaternary ammonium salt of the formula (1a) and the compound of the formula (6) and will not adversely affect the reaction. Examples of such solvents are water, dichloromethane, chloroform, carbon tetrachloride and like hydrocarbon halides, methanol, ethanol, isopropanol, n-butanol, tert-butanol and like lower alcohols, acetone, methyl ethyl ketone and like ketones, ethyl acetate, butyl acetate and like esters, dimethyl sulfoxide, dimethylformamide and like aprotic polar solvents.

Preferable among these are methanol and like lower alcohols, chloroform and like hydrocarbon halides and water. These solvents are usable singly, or at least two of them are usable in admixture.

Ion exchange resins may be used for salt exchange. Anion exchange resins are used for this purpose. The anion of the resin is exchanged for the desired anion in advance, and a solution of the compound of the formula (1a) in a solvent is passed through the resin, whereby the contemplated exchange can be accomplished. The solvent to be used can be a wide variety of solvents insofar as they are capable of dissolving the compound of the formula (1a) and will not adversely affect the exchange reaction. Water and alcohols are generally useful.

The quaternary ammonium salt of the formula (1a) and the compound of the formula (6) are used in the ratio usually of 0.5 to 5 moles, preferably 0.9 to 1.2 moles, of the latter per mole of the former.

The reaction of the quaternary ammonium salt of the formula (1a) with the compound of the formula (6) proceeds usually rapidly, so that a solution of the two reactants as dissolved in a solvent is reacted at room temperature for about 10 minutes to about 2 hours.

The desired products obtained by the foregoing respective reactions can each be readily isolated from the reaction mixture and purified by usual isolating and purifying means such as centrifuging, concentration, washing, organic solvent extraction, chromatography and recrystallization.

Stated specifically, the quaternary ammonium salt of the formula (1) wherein $X^1$ is $BF_4$ is prepared from a quaternary ammonium salt of the formula (1a) by the reaction procedure to be described below. The quaternary ammonium salt of the formula (1a) is dissolved in one of the lower alcohols mentioned above, and a specified amount of a fluoroborate, such as borofluoric acid or silver borofluoride is added to the solution to conduct a reaction at room temperature for about 30 minutes. The hydrogen halide resulting from the reaction is distilled off, silver halide or like halogen salt is filtered off, and the filtrate is concentrated in a vacuum and dried, whereby the desired compound can be isolated. The hydrogen halide can be removed by a known method, for example, by bubbling of $N_2$ gas or by distillation in a vacuum.

The quaternary ammonium salt of the formula (1) wherein $X^1$ is $N(CF_3SO_2)_2$ is prepared from a quaternary ammonium salt of the formula (1a) by the reaction procedure to be described below specifically. The quaternary ammonium salt of the formula (1a) is dissolved in water, a specified amount of alkali metal salt of bistrifluoromethanesulfonylimide (lithium salt, sodium salt, potassium salt or like salt of bistrifluoromethanesulfonylimide) is added to the solution, followed by a reaction at 0 to 25° C. for 30 minutes. The desired product formed is extracted from a suitable solvent (such as dichloromethane, chloroform or ethyl acetate), and the extract is washed with water, then concentrated in a vacuum and dried, whereby the desired product can be isolated.

The organic solvent to be used in the electrolytic solution for nonaqueous electrolytic lithium secondary cells is not limited particularly insofar as the solvent will not produce any adverse effect on the characteristics of cells. Examples of such solvents are cyclic carbonic acid esters, chain carbonic acid esters, phosphoric acid esters, cyclic ethers, chain ethers, lactone compounds, chain esters, nitrile compounds, amide compounds, sulfone compounds, etc. Although not limitative, the solvents given below are more specific examples of useful solvents.

Examples of cyclic carbonic acid esters are ethylene carbonate, propylene carbonate, butylene carbonate, vinylene carbononate, vinylethylene carbonate, etc.

Examples of chain carbonic acid esters are dimethyl carbonate, ethylmethyl carbonate, diethyl carbonate, etc.

Examples of phosphoric acid esters are trimethyl phosphate, triethyl phosphate, ethyldimethyl phosphate, diethylmethyl phosphate, etc.

Examples of cyclic ethers are tetrahydrofuran, 2-methyltetrahydrofuran, etc.

Examples of chain ethers are dimethoxyethane, etc.

Examples of lactone compounds are gamma-butyrolactone and the like.

Examples of chain esters are methyl propionate, methyl acetate, ethyl acetate, methyl formate, etc.

Examples of nitrile compounds are acetonitrile and the like.

Examples of amide compounds are dimethylformamide and the like.

Examples of sulfone compounds are sulfolane, methyl sulfolane, etc.

These solvents may be used singly, or at least two of them are usable in admixture.

The organic solvent for use in the present invention contains vinylene carbonate in an amount of 1 to 5 wt. % based on the electrolytic solution. When vinylene carbonate is present in an amount of 1 to 5 wt. % based on the electrolytic solution, a film known as SEI (Solid Electrolyte Interface) is formed on the surface of the negative electrode for selectively passing lithium ions therethrough. The film suppresses the decomposition of the room temperature molten salt, inhibiting ammonium cations from becoming inserted into the negative electrode material and consequently affording stabilized charge-discharge characteristics.

The concentration of the lithium salt is usually 0.1 to 2.0 M, preferably 0.15 to 1.5 M, more preferably 0.2 to 1.2 M, most preferably 0.3 to 1.0 M. If the lithium salt concentration is less than 0.1 M, depletion of lithium ions will occur in the vicinity of the electrode at a high charge-discharge rate to result in a tendency toward lower charge-discharge characteristics. If the lithium ion concentration is over 2.0 M, the electrolytic solution tends to have an increased viscosity and lower electric conductivity.

According to the present invention, it is desired that one of the anions forming the respective room temperature molten salt and the lithium salt contain $BF_4^-$. Although the reason still remains to be clarified, the desirable result appears attributable to the presence of tetrafluoroborate which forms a passive film on the surface of an aluminum foil serving as a positive electrode current collector, inhibiting the aluminum from dissolving out. It is desirable to adjust the number of ions contained in the $BF_4^-$ to at least 0.5% of the total number of anions in the electrolytic solution. It is more desirable to adjust the number of ions to at least 0.8% of the total number. The upper-limit concentration is such that the number of ions contained in 100% of the $BF_4^-$ is 100% of the total number of anions in the electrolytic solution.

The concentration of the room temperature molten salt is preferably 1 to 15 wt. %, more preferably 4 to 13 wt. %, most preferably 4 to 9 wt. %, based on the electrolytic solution. If the salt concentration is lower than 1 wt. %, the electrolytic solution fails to fully reduce the internal resistance of the lithium secondary cell wherein the solution is used, whereas if the salt concentration is in excess of 15 wt. %, the electrolytic solution is liable to have a higher viscosity and lower electric conductivity. It is then also likely that the lithium secondary cell incorporating the electrolytic solution will have lower capacitance.

The electrolytic solution according to the invention and thus prepared is suitable for use in fabricating nonaqueous electrolytic lithium secondary cells. The lithium secondary cell of the invention is, for example, in the form of a coin, hollow cylinder, square or rectangle or laminate. However, these forms are not limitative. FIG. 1 shows a coin-shaped cell as an example of nonaqueous electrolytic lithium secondary cell.

The nonaqueous electrolytic lithium secondary cell will be described below based on FIG. 1.

Into internal space defined by a positive electrode can 4 and a negative electrode can 5 are placed a positive electrode 1, separator 3, negative electrode 2 and spacer 7 in this order to provide a stack of superposed layers as positioned on the positive electrode can 4. A spring 8 is interposed between the negative electrode can 5 and the spacer 7 to press the positive electrode 1 and the negative electrode 2 against each other and fixedly position the electrodes in place. The assembly of positive electrode 1, separator 3 and negative electrode 2 is impregnated with the electrolytic solution. With a gasket 6 provided between the positive and negative cans 4, 5, the two cans 4 and 5 are joined by crimping, whereby the stack of components is enclosed as sealed off.

Examples of positive electrode active substances are composite oxides of lithium and transition metal or metals, such as $LiCoO_2$, $LiNiO_2$, $LiNi_{1-x}Co_xO_2$, $LiNi_{1-y-z}Co_yMn_zO_2$, $LiNi_{0.5}Mn_{0.5}O_2$, $LiMnO_2$, $LiMn_2O_4$ and $LiNi_{0.5}Mn_{1.5}O_4$, oxides such as $TiO_2$ and $V_2O_5$, sulfides such as $TiS_2$ and $FeS$, etc. From the viewpoint of cell capacity and energy density, composite oxides of lithium and transition metal or metals are desirable.

In the above, $1>x>0$, $1>y>0$, $1>z>0$, $y+z<1$. Such a positive electrode active substance can be molded into a positive electrode along with known auxiliary conductive-agent and binder under pressure. Alternatively, the positive electrode can be made by mixing the positive electrode active substance with pyrrolidine or like organic solvent along with known conductive agent and binder to prepare a paste, coating a current collector of aluminum foil with the paste and drying the coating.

Examples of negative electrode active substances are a metal lithium, alloy of metal lithium and other metal, and a material for lithium ions to be inserted thereinto and to be released therefrom. Examples of alloys of metal lithium and other metals are Li—Al, Li—Sn, Li—Zn, Li—Si, etc. Examples of materials for lithium ions to be inserted thereinto and to be released therefrom are carbon materials prepared by firing a resin or pitch, a carbon material obtained by adding a boron compound to such a carbon material, natural graphite, etc. These negative electrode materials can be used singly, or at least two of them are usable in admixture. Such a negative electrode material can be molded into a negative electrode along with known auxiliary conductive agent and binder under pressure. Alternatively, the negative electrode can be made by mixing the negative electrode active substance with pyrrolidone or like organic solvent along with known conductive agent and binder to prepare a paste, coating a current collector of copper foil with the paste and drying the coating.

The separator for use in the invention can be made from a material which is not limited particularly insofar as the material readily passes the electrolytic solution therethrough, has insulating properties and is chemically stable.

The electrolytic solution of the invention is high in electrical conductivity and is suitable for use as an electrolytic solution for a non-aqueous lithium secondary battery.

The nonaqueous electrolytic lithium secondary cell wherein the electrolytic solution of the invention is used has diminished internal resistance and stabilized charge-discharge characteristics.

The nonaqueous electrolytic lithium secondary cell of the present invention is characterized in that the electrolytic solution contains vinylene carbonate. The electrolytic solution contains, 1 to 5 wt. % of vinylene carbonate, which forms a film known as SEI (Solid Electrolyte Interface) on the surface of the negative electrode for selectively passing lithium ions therethrough. The film suppresses the decomposition of the room temperature molten salt, inhibiting ammonium cations from becoming inserted into the negative electrode material. The nonaqueous electrolytic lithium secondary cell incorporating the electrolytic solution exhibits stabilized charge-discharge characteristics.

Further a nonaqueous electrolytic lithium secondary cell is fabricated using an electrolytic solution wherein at least one of $X^1$ and $X^2$, which are fluorine-containing anions respectively forming the room temperature molten salt and the lithium salt, contains tetrafluoroborate. The cell has desirable charge-discharge characteristics. Although the reason still remains to be clarified, the desirable characteristics appear attributable to the presence of tetrafluoroborate which forms a passive film on the surface of an aluminum member serving as a positive electrode current collector, inhibiting the aluminum from dissolving out.

Figure 1:
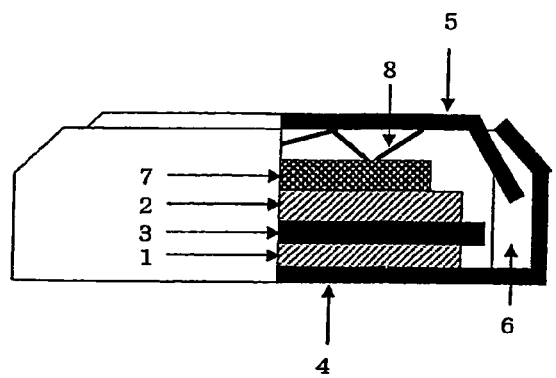
FIG. 1 is a sectional view of a lithium secondary cell fabricated in examples of the invention.

1 positive electrode, 2 negative electrode, 3 porous separator, 4 positive electrode can, 5 negative electrode can, 6 gasket, 7 spacer, 8 spring, 11 negative electrode terminal, 12 aluminum laminate, 13 positive electrode terminal, 14 negative electrode sheet, 15 positive electrode sheet, 16 separator, 17 negative electrode lead wire, 18 positive electrode lead wire.

BEST MODE OF CARRYING OUT THE INVENTION

The present invention will be described in greater detail with reference to the following examples. However, the scope of the invention is not limited to these examples.

PREPARATION EXAMPLE 1

Preparation of
N,N-diethyl-N-methyl-N-methoxymethylammonium Chloride (DEMMOMCl)

A 30.0 g quantity of N,N diethyl-N-methylamine (reagent, product of Tokyo Kasei Co., Ltd.) was dissolved in 120 g of toluene, followed by nitrogen replacement. Over a period of 1 hour, 31.2 g of chloromethyl methyl ether (reagent, product of Tokyo Kasei Co., Ltd.) was added dropwise to the solution at 5° C. The mixture was stirred at 5° C. for 1 hour, heated to a gradually elevated temperature and stirred at room temperature for 10 hours to complete the reaction. The reaction mixture was filtered, and the solids obtained were washed with 150 g of toluene and 150 g of acetone and then dried in a vacuum, giving 53.7 g of the desired product (white solid).
$^1$H-NMR(CD$_3$OD) δppm: 1.33 (m, 6H), 2.97 (s, 3H), 3.38 (m, 4H), 3.64 (s, 3H), 4.59 (s, 2H).

PREPARATION EXAMPLE 2

Preparation of
N,N-diethyl-N-methyl-N-methoxymethylammonium bistrifluoromethanesulfonylimide (DEMMOMTFSI)

A 15.0 g quantity of the N,N-diethyl-N-methyl-N-methylmethoxymethylammonium chloride prepared in Preparation Example 1 was dissolved in 85 g of water, and 26.9 g of lithium bistrifluoromethanesulfonylimide (reagent, product of Aldrich Corp.) was added to the solution at room temperature. The mixture was stirred for 30 minutes, and chloroform was added to the mixture for extraction. The organic layer was-washed with 50 g of water 15 times, concentrated in a vacuum and dried, affording 33.4 g of the desired product in the form of a colorless transparent liquid.
$^1$H-NMR (CD$_3$OD) δppm: 1.32 (m, 6H), 2.95 (s, 3H), 3.35 (m, 4H), 3.63 (s, 3H), 4.55 (s, 2H).

PREPARATION EXAMPLE 3

Preparation of
N,N-diethyl-N-methyl-N-methoxymethylammonium tetrafluoroborate (DEMMOMBF4)

A 30.0 g quantity of the N,N-diethyl-N-methyl-N-methylmethoxymethylammonium chloride prepared in Preparation Example 1 was dissolved in 30.0 g of MeOH, and 52.4 g of 30 wt % HBF$_4$ solution in methanol was added to the solution. The mixture was heated at 130° C. under nitrogen stream. Hydrogen chloride (by-product) and excess of HBF$_4$ and MeOH were removed, affording 38.8 g of the desired product.
$^1$H-NMR(CD$_3$OD) δppm: 1.32 (m, 6H), 2.95 (s, 3H), 3.36 (m, 4H), 3.63 (s, 3H), 4.56 (s, 2H).

PREPARATION EXAMPLE 4

Preparation of
N-ethyl-N-methoxymethyl-N,N-dimethylammonium chloride (EMOMDMCl)

A 47.50 g quantity of ethyldimethylamine (reagent, product of Tokyo Kasei Co., Ltd.) was dissolved in 300 g of dehydrated acetone(reagent, Wako Pure Chemical Ind. Ltd.), followed by nitrogen replacement. Over a period of 1 hour, 52.30 g of chloromethyl methyl ether (reagent, product of Tokyo Kasei Co., Ltd., distilled one) was added dropwise to the solution at 5° C. The mixture was stirred at lower than 15° C. for 5 hour to complete the reaction. The reaction mixture was cooled to 5° C. and was filtered under nitrogen atmosphere. The solids obtained were washed with 150 g of acetone and then dried in a vacuum, giving 85.90 g of the desired product (white solid).
$^1$H-NMR(CD$_3$OD) δppm: 1.36 (m, 3H), 3.04 (s, 6H), 3.41 (q, 2H), 3.68 (s, 3H), 4.63 (s, 2H).

PREPARATION EXAMPLE 5

Preparation of
N-ethyl-N-methoxymethyl-N,N-dimethylammonium bistrifluoromethanesulfonylimide (EMOMDMTFSI)

A 15.0 g quantity of the N-ethyl-N-methoxymethyl-N,N-dimethylammonium chloride prepared in Preparation Example 4 was dissolved in 85 g of water, and 27.0 g of lithium bistrifluoromethanesulfonylimide (reagent, product of Aldrich Corp.) was added to the solution at room temperature. The mixture was stirred for 30 minutes, and chloroform was added to the mixture for extraction. The organic layer was washed with 50 g of water 15 times, concentrated in a vacuum and dried, affording 26.9 g of the desired product in the form of a colorless transparent liquid.
$^1$H-NMR(CD$_3$OD) δppm: 1.34 (m, 3H), 3.00 (s, 6H), 3.38 (q, 2H), 3.66 (s, 3H), 4.56 (s, 2H).

PREPARATION EXAMPLE 6

Preparation of
N-ethyl-N-methoxymethyl-N,N-dimethylammonium tetrafluoroborate (EMOMDMBF4)

A 40.0 g quantity of the N-ethyl-N-methoxymethyl-N,N-dimethylammonium chloride prepared in Preparation Example 4 was dissolved in 40.0 g of MeOH, and 62.8 g of 30 wt % $HBF_4$ solution in methanol was added to the solution. The mixture was heated at 130° C. under nitrogen stream. Hydrogen chloride (by-product) and excess of $HBF_4$ and MeOH were removed, affording 49.7 g of the desired product.

$^1$H-NMR($CD_3OD$) δppm: 1.34 (m, 3H), 3.00 (s, 6H), 3.38 (q, 2H), 3.66 (s, 3H), 4.57 (s, 2H).

Preparation of Electrolytic Solutions

EXAMPLES 1 TO 4 AND COMPARATIVE EXAMPLES 1 to 3

Nonaqueous electrolytic solutions were prepared in Examples, 1 to 4 of the invention using a salt or room temperature molten salts, i.e., N,N-diethyl-N-methyl-N-methoxymethylammonium bistrifluoromethanesulfonylimide (DEMMOMTFSI) and N,N-diethyl-N-methyl-N-methoxymethylammonium tetrafluoroborate (DEMMOMBF4), a lithium salt or salts, i.e., lithium bistrifluoromethanesulfonylimide (LiTFSI), lithium tetrafluoroborate ($LiBF_4$) and lithium hexafluorophosphate ($LiPF_6$), and nonaqueous solvents, i.e., vinylene carbonate (VC, product of Kishida Chemical Co., Ltd.), ethylene carbonate (EC, product of Kishida Chemical Co., Ltd.) and ethylmethyl carbonate (EMC, product of Kishida Chemical Co., Ltd.) in the corresponding proportions listed in Table 1. For comparison, electrolytic solutions were prepared from LiTFSI, EC and EMC (Comparative Examples, 1 and 2), and an electrolytic solution was prepared from $LiPF_6$, EC and EMC (Comparative Example 3).

Evaluation of Electric Conductivity and Cell Characteristics of the Electrolytic Solution An electric conductivity meter, manufactured by Radiometer GmbH, was used for measuring the electric conductivity. The measuring cell used was CDC641T, product of Radiometer GmbH.

Fabrication of Nonaqueous Electrolytic Lithium Secondary Cells of the Coin Type

Nonaqueous electrolytic lithium secondary cells of the coin type, like the one shown in FIG. 1, were fabricated. With reference to FIG. 1, indicated at 1 is a positive electrode, at 2 a negative electrode, at 3 a porous separator, at 4 a positive electrode can, at 5 a negative electrode can, at 6 a gasket, at 7 a spacer, and at 8 a spring.

The lithium secondary cell shown in FIG. 1 was fabricated by the procedure to be described below.

Preparation of Negative Electrode 2

Natural graphite and polyvinylidene fluoride (PVdF) serving as a binder were mixed together in a weight ratio of 9:1, and N-methylpyrrolidone was added to the mixture to obtain a paste. Copper foil, 22 μm in thickness, was uniformly coated with the paste using an electrode coating applicator. The coated copper foil was dried in a vacuum at 120° C. for 8 hours and made into negative electrodes, 2, 16 mm in diameter, by an electrode blanking press.

Preparation of Positive Electrode 1

A powder of $LiCoO_2$, acetylene black serving as a conductive auxiliary agent and PVdF serving as a binder were mixed together in a weight ratio of 90:5:5, and N-methylpyrrolidone was added to the mixture to obtain a paste. The paste was dried in a vacuum at 120° C. for 8 hours and made into positive electrodes, 1, 16 mm in diameter, by an electrode blanking press.

The positive electrode 1 was placed on the bottom wall of a positive electrode can 4, a porous separator 3 was placed on the electrode, the nonaqueous electrolytic solution prepared in Example 1 was then poured into the can, and a gasket 6 was inserted in place. The negative electrode 2, spacer 7, spring 8 and negative electrode can 5 were thereafter placed in this order over the separator 3, and the opening portion of the positive electrode can 4 was folded inward to seal off the resulting assembly using a coin-type cell crimping machine, whereby a nonaqueous electrolytic lithium secondary cell was fabricated.

In Examples, 2 to 4 and Comparative Examples, 1 to 3, electrolytic solutions were checked for electric conductivity in the same manner as the electrolytic solution of Example 1, and nonaqueous electrolytic lithium secondary cells were fabricated by the same procedure as in Example 1.

The cells fabricated were evaluated in the following manner. Each of the cells was charged at a constant current of 0.4 mA, and when the voltage reached 4.1 V, the cell was charged at a constant voltage of 4.1 V for 1 hour. The cell was discharged at a constant current of 1.0 mA until the voltage dropped to 3 V. The cell was held at 3 V for 1 hour upon the voltage reaching 3 V. This charge and discharge steps were combined together as one cycle.

TABLE 1

| | room temperature molten salt (wt %) | lithium salt (mol) | Organic solvent (wt %) | Electric Conductivity (mScm$^{-1}$) 25° C. | −10° C. | ※1 |
|---|---|---|---|---|---|---|
| Ex. 1 | DEMMOMTFSI(12.5) + DEMMOMBF4(0.5) | LiTFSI(0.5) | VC(5) + EC(15.6) + EMC(54.4) | 10 | 5 | good |
| Ex. 2 | DEMMOMTFSI(13) | LiTFSI(0.5) + LiBF$_4$(0.025) | VC(5) + EC(15.6) + EMC(54.4) | 9.8 | 4.9 | good |
| Ex. 3 | EMOMDMTFSI(12) + EMOMDMBF4(0.5) | LiTFSI(0.5) | VC(5) + EC(15.7) + EMC(54.8) | 11 | 5.5 | good |
| Ex. 4 | EMOMDMTFSI(12.5) | LiTFSI(0.5) + LiBF$_4$(0.025) | VC(5) + EC(15.7) + EMC(54.8) | 10 | 5 | good |
| Com. Ex. 1 | None | LiTFSI(0.5) | EC(25) + EMC(75) | 6.5 | 3.4 | No good |
| Com. Ex. 2 | None | LiTFSI(1.0) | EC(25) + EMC(75) | 6.6 | 3.6 | No good |
| Com. Ex. 3 | None | LiPF$_6$(1.0) | EC(25) + EMC(75) | 8.0 | 3.1 | good |

※1: cell characteristics

EXAMPLES 5 TO 12 AND COMPARATIVE EXAMPLES 4 to 8

Figure 2:
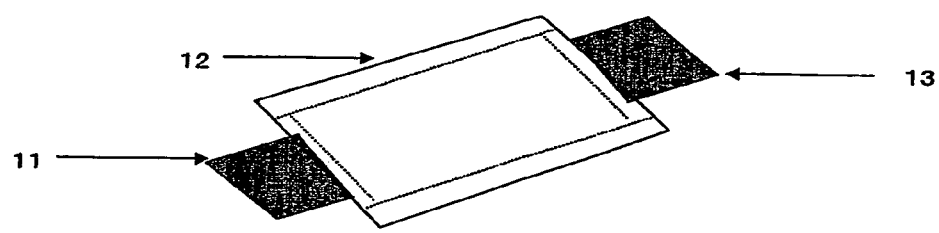
FIG. 2 is a perspective view of a lithium secondary cell of the laminate type fabricated in other examples of the invention.
Figure 3:
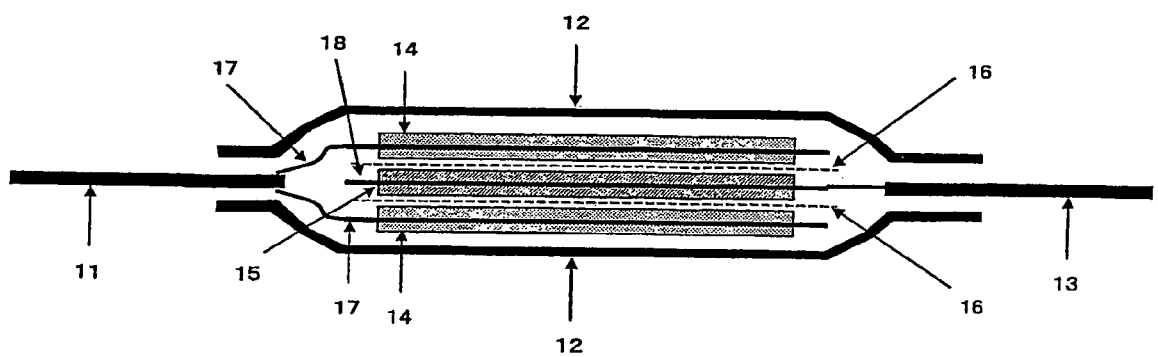
FIG. 3 is a sectional view of the lithium secondary cell of the laminate type fabricated in these other examples of the invention.

Fabrication of Nonaqueous Electrolytic Lithium Secondary Cells of the Laminate Type Lithium secondary cells of the laminate type, like the one shown in FIGS. 2 and 3, were fabricated. The nonaqueous electrolytic lithium secondary cells of the laminate type according to the invention were checked for the evaluation of the performance thereof.

Preparation of Negative Electrode Sheets 14

Natural graphite and polyvinylidene fluoride (PVdF) serving as a binder were mixed together in a weight ratio of 93:7, and N-methylpyrrolidone was added to the mixture to obtain a paste. Copper foil, 14 μm in thickness, was uniformly coated with the paste over opposite surfaces thereof using an electrode coater. The foil was coated except at an end portion for use in welding a lead wire to the foil. The coated copper foil was dried in a vacuum at 120° C. for 8 hours to obtain a blank of negative electrode sheet 14. Rectangular pieces, 70 mm×70 mm, were blanked out from the sheet blank, and a copper wire was welded to each piece to obtain negative electrode sheets 14.

Preparation of Positive Electrode Sheets 15

A powder of $LiNi_{1/3}Mn_{1/3}Co_{1/3}O_2$, a conductive auxiliary agent (Super-P, product of ERACHEM COMILOG) and PVdF serving as a binder were mixed together in a weight ratio of 90:5:5, and N-methylpyrrolidone was added to the mixture to obtain a paste. Aluminum foil, 20 μm in thickness, was uniformly coated with the paste over opposite surfaces thereof using an electrode coater. The foil was coated except at an end portion for use in welding a lead wire to the foil. The coated foil was dried in a vacuum at 120° C. for 8 hours to obtain a blank of positive electrode sheet 15. Rectangular pieces, 68 mm×68 mm, were blanked out from the sheet blank, and an aluminum wire was welded to each piece to obtain positive electrode sheets 15.

Assembly of Laminate-type Cell

FIG. 3 is a sectional view showing the nonaqueous electrolytic lithium secondary cell of the laminate type.

Two negative electrode sheets 14 thus prepared and one positive electrode sheet 15 prepared above were arranged in superposed layers, with a polypropylene separator interposed between each adjacent pair of sheets, as shown in FIG. 3. The resulting assembly was impregnated with an electrolytic solution having adjusted concentrations as listed in Table 2. The impregnated assembly was packaged by lamination. In this way, nonaqueous electrolytic lithium secondary cells of the laminate type were obtained in Examples, 5 to 12 and Comparative Examples, 4 to 8.

Measurement of Internal Resistance and Cycle Characteristics of the Cells

Each of the nonaqueous electrolytic lithium secondary cells of the laminate type thus fabricated was immersed in a constant-temperature bath having a temperature of 25° C., held therein for 1 hour, and thereafter checked for internal resistance. The cell was charged and discharged using a charge-discharge device manufactured by Hokuto Denko Co., Ltd. The cell was charged to 50% of the initial service capacity, and thereafter subjected to a pulse charge-discharge operation at a current value of 75 mA, 150 mA and 300 mA each for 10 seconds. The voltage thus applied for 10 seconds was plotted against the corresponding current, and the slope of the resulting line of approximation was taken as the internal resistance measured. Table 2 shows the measurement of internal resistance as obtained for each electrolytic solution and expressed relative to the internal resistance of Comparative Example 4 which was taken as 100.

Further in the same manner as the measurement of internal resistance, each of the lithium secondary cells of the laminate type fabricated was immersed in a constant-temperature bath having a temperature of 25° C., held therein for 1 hour and thereafter checked for cycle characteristics. The cell was charged at a constant current of 100 mA, and then charged alternatively at a constant voltage of 4.2 V upon the voltage reaching 4.2 V. The constant-voltage charging was so completed that the sum of the period of constant-current charging and the period of constant-voltage charging would be 2.5 hours. The cell was discharged at a constant current of 75 mA, and the discharging was terminated upon the voltage reaching 2.75 V. The charge and discharge steps described were combined together as one cycle. The same procedure as above was performed for the second and subsequent cycles. Table 2 shows the initial capacity as obtained for each electrolytic solution and expressed relative to the initial capacity of Comparative Example 4 which was taken as, 100, and capacity retentivity which is the ratio of the discharge capacity obtained for tenth cycle to the corresponding initial capacity.

TABLE 2

|   | room temperature molten salt (wt %) | lithium salt (mol) | Organic solvent (wt %) | ※2 | ※3 (%) | ※4 |
|---|---|---|---|---|---|---|
| Ex. 5 | EMOMDMTFSI(8.6) | LiPF$_6$(12.5) | VC(1) + EC(19.5) + EMC(58.4) | 67.3 | 90 | 51.8 |
| Ex. 6 | EMOMDMTFSI(8.3) | LiPF$_6$(12) | VC(5) + EC(18.7) + EMC(56) | 74.5 | 92 | 71.4 |
| Ex. 7 | EMOMDMTFSI(4.3) | LiPF$_6$(12.7) | VC(1) + EC(20.5) + EMC(61.5) | 81.2 | 92 | 50.2 |
| Ex. 8 | EMOMDMTFSI(4.1) | LiPF$_6$(12.2) | VC(5) + EC(19.7) + EMC(59) | 89.9 | 93 | 69.2 |
| Ex. 9 | EMOMDMTFSI(12.5) | LiPF$_6$(11.9) | VC(5) + EC(17.6) + EMC(53) | 65.5 | 87 | 73.8 |
| Ex. 10 | EMOMDMTFSI(4.1) + EMOMDMBF4(0.2) | LiPF$_6$(12.7) | VC(1) + EC(20.5) + EMC(61.5) | 83.5 | 93 | 52.3 |
| Ex. 11 | EMOMDMTFSI(4.3) | LiPF$_6$(12.6) + LiBF$_4$(0.1) | VC(1) + EC(20.5) + EMC(61.5) | 84.0 | 93 | 51.5 |
| Ex. 12 | EMOMDMTFSI(4.3) | LiPF$_6$(12.5) | VC(2.5) + EC(20.2) + EMC(60.5) | 85.3 | 92 | 60.5 |
| Com. Ex. 4 | None | LiPF$_6$(13.0) | EC(21.8) + EMC(65.2) | 100 | 92 | 100 |
| Com. Ex. 5 | EMOMDMTFSI(8.2) | LiPF$_6$(11.9) | EC(23.8) + EMC(56.1) | 65.1 | 58 | 50.2 |

TABLE 2-continued

| | room temperature molten salt (wt %) | lithium salt (mol) | Organic solvent (wt %) | ※2 | ※3 (%) | ※4 |
|---|---|---|---|---|---|---|
| Com. Ex. 6 | EMOMDMTFSI(7.9) | LiPF$_6$(11.4) | VC(10) + EC(17.7) + EMC(53.0) | 81.8 | 93 | 108 |
| Com. Ex. 7 | EMOMDMTFSI(16.4) | LiPF$_6$(12.5) | VC(5.3) + EC(16.4) + EMC(49.4) | 35.5 | 42 | 78.1 |
| Com. Ex. 8 | EMOMDMTFSI(8.7) | LiPF$_6$(12.6) | VC(0.5) + EC(19.5) + EMC(58.7) | 66.3 | 70.3 | 51.3 |

※2: initial capacity
※3: capacity retentivity
※4: internal resistance

INDUSTRIAL APPLICABILITY

The electrolytic solution and the nonaqueous electrolytic lithium secondary cell of the invention are excellent in safety. The solution is improved in electric conductivity over a low temperature range and ensures stabilized charge-discharge characteristics.

The electrolytic solution and the nonaqueous electrolytic lithium secondary cell of the invention are improved in internal resistance and afford stabilized charge-discharge characteristics.

The invention claimed is:

1. An electrolytic solution for use in nonaqueous electrolytic lithium secondary cells which contains a room temperature molten salt which is an aliphatic quaternary ammonium salt of the formula (1), an organic solvent and a lithium salt of the formula (2), the electrolytic solution being characterized in that the organic solvent contains vinylene carbonate in an amount of 1 to 5 wt. % based on the electrolytic solution

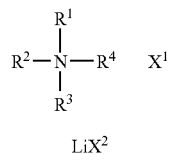
(1)

LiX$^2$ (2)

wherein $R^1$ to $R^3$ are each a chain hydrocarbon having 1 to 4 carbon atoms, $R^4$ is methoxymethyl, ethoxymethyl, propoxymethyl or isopropoxymethyl, and $X^1$ and $X^2$ are each a fluorine-containing anion.

2. An electrolytic solution according to claim 1 wherein at least one of the fluorine-containing anions $X^1$ and $X^2$ contains tetrafluoroborate.

3. An electrolytic solution according to claim 1 wherein the room temperature molten salt is contained in an amount of 1 to 15 wt. % based on the electrolytic solution.

4. An electrolytic solution according to claim 1 wherein the room temperature molten salt is contained in an amount of 4 to 13 wt. % based on the electrolytic solution.

5. An electrolytic solution according to claim 1 wherein the room temperature molten salt is contained in an amount of 4 to 9 wt. % based on the electrolytic solution.

6. A nonaqueous electrolytic lithium secondary cell comprising a positive electrode, a negative electrode, a separator and a nonaqueous electrolytic solution, the secondary cell being characterized in that the electrolytic solution according to claim 1 is used as the nonaqueous electrolytic solution.

7. A secondary cell according to claim 6 wherein at least one of the fluorine-containing anions $X^1$ and $X^2$ of the formulas (1) and (2) contains tetrafluoroborate.

8. A secondary cell according to claim 6 wherein the room temperature molten salt of the electrolytic solution is contained in an amount of 1 to 15 wt. % based on the electrolytic solution.

9. A secondary cell according to claim 6 which is characterized in that negative electrode is a carbon material which absorbs and desorbs lithium ions.

* * * * *